(12) United States Patent
Aoki et al.

(10) Patent No.: US 7,760,213 B2
(45) Date of Patent: Jul. 20, 2010

(54) CONTRAST ADJUSTING CIRCUITRY AND VIDEO DISPLAY APPARATUS USING SAME

(75) Inventors: Hiroshi Aoki, Yokohama (JP); Ryo Hasegawa, Yokohama (JP); Takaaki Matono, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/428,246

(22) Filed: Apr. 22, 2009

(65) Prior Publication Data

US 2009/0262245 A1 Oct. 22, 2009

Related U.S. Application Data (63) Continuation of application No. 11/655,869, filed on Jan. 22, 2007, now Pat. No. 7,701,475, which is a continuation of application No. 11/258,994, filed on Oct. 27, 2005, now Pat. No. 7,227,543, which is a continuation of application No. 11/102,771, filed on Apr. 11, 2005, now Pat. No. 7,151,535, which is a continuation of application No. 10/295,033, filed on Nov. 15, 2002, now Pat. No. 6,982,704.

(30) Foreign Application Priority Data

Apr. 5, 2002 (JP) .............................. 2002-104383

(51) Int. Cl.
G09G 5/10 (2006.01)
(52) U.S. Cl. ..................................... 345/690
(58) Field of Classification Search ................. 345/1.1, 345/30, 63, 87–98, 102, 147, 204–213, 619, 345/620, 690; 348/72, 131, 187, 207.99, 348/460, 500, 572, 614, 673, 678, 689; 250/211; 358/27
See application file for complete search history.

(56) References Cited

U.S. PATENT DOCUMENTS

| | | | | |
|---|---|---|---|---|
| 3,914,545 A | * | 10/1975 | Engel | 348/673 |
| 3,944,816 A | | 3/1976 | Harada | |
| 4,198,652 A | | 4/1980 | Parker | |
| 4,679,067 A | | 7/1987 | Belmares-Sarabia et al. | |
| 4,807,031 A | * | 2/1989 | Broughton et al. | 348/460 |
| 4,866,511 A | | 9/1989 | Belmares-Sarabia et al. | |
| 4,947,253 A | * | 8/1990 | Neal | 348/673 |
| 4,962,425 A | * | 10/1990 | Rea | 348/187 |
| 5,113,248 A | | 5/1992 | Hibi et al. | |
| 5,157,518 A | | 10/1992 | Ohtaki et al. | |
| 5,208,661 A | | 5/1993 | Jaspers | |

(Continued)

FOREIGN PATENT DOCUMENTS

CN 2054240 U 3/1990

(Continued)

OTHER PUBLICATIONS

United States Notice of Allowance issued in U.S. Appl. No. 11/655,869 dated Oct. 13, 2009.

*Primary Examiner*—Prabodh M Dharia
(74) *Attorney, Agent, or Firm*—McDermott Will & Emery LLP (57) ABSTRACT

With the aim of offering a video display technique by which stable and high contrast video images are reproduced, contrast adjusting circuitry is constructed. The contrast adjusting circuitry detects a maximum picture level (MPL) and an average picture level (APL) of luminance signals for a predetermined period, determines one of the predefined luminance regions within which the MPL falls and one of the predefined luminance regions within which the APL falls, and, based on the thus determined luminance regions of both MPL and APL, carries out a contrast adjustment of video images by changing the gain of luminance signals and color depth correction by changing the gain of color signals.

9 Claims, 10 Drawing Sheets

U.S. PATENT DOCUMENTS

| | | |
|---|---|---|
| 5,255,080 A | 10/1993 | Kageyama et al. |
| 5,341,177 A | 8/1994 | Roy et al. |
| 5,359,675 A | 10/1994 | Siwoff |
| 5,396,257 A * | 3/1995 | Someya et al. ............... 345/1.1 |
| 5,475,420 A * | 12/1995 | Buchin ........................ 348/72 |
| 5,519,518 A * | 5/1996 | Watanabe et al. ............. 349/57 |
| 5,597,223 A * | 1/1997 | Watanabe et al. ............. 353/97 |
| 5,638,137 A | 6/1997 | Thomas |
| 5,764,299 A | 6/1998 | Jennes et al. |
| 5,808,699 A | 9/1998 | Tsujihara et al. |
| 5,835,792 A | 11/1998 | Wise et al. |
| 5,940,672 A | 8/1999 | Balaban et al. |
| 5,953,074 A * | 9/1999 | Reddy ........................ 348/558 |
| 6,078,361 A * | 6/2000 | Reddy ........................ 348/558 |
| 6,111,607 A | 8/2000 | Kameyama |
| 6,195,079 B1 * | 2/2001 | Reddy ........................ 345/3.1 |
| 6,278,436 B1 | 8/2001 | Hosoi et al. |
| 6,285,344 B1 * | 9/2001 | Everard et al. ............... 345/3.1 |
| 6,297,791 B1 | 10/2001 | Naito et al. |
| 6,476,821 B2 | 11/2002 | Sawada et al. |
| 6,542,180 B1 | 4/2003 | Wasserman et al. |
| 6,731,273 B2 | 5/2004 | Koyama et al. |
| 6,943,848 B2 | 9/2005 | Funke |
| 6,982,704 B2 * | 1/2006 | Aoki et al. .................. 345/204 |
| 7,151,535 B2 * | 12/2006 | Aoki et al. .................. 345/204 |
| 7,199,840 B2 * | 4/2007 | Shiota ........................ 348/678 |
| 7,227,543 B2 * | 6/2007 | Aoki et al. .................. 345/204 |
| 7,227,559 B2 * | 6/2007 | Aoki et al. .................. 345/690 |
| 7,408,587 B2 | 8/2008 | Matsutani et al. |
| 2002/0021292 A1 | 2/2002 | Sakashita |
| 2002/0024529 A1 | 2/2002 | Miller et al. |
| 2002/0149679 A1 | 10/2002 | Deangelis et al. |
| 2002/0171772 A1 | 11/2002 | Funke |
| 2002/0191104 A1 | 12/2002 | Matsutani et al. |
| 2003/0001804 A1 | 1/2003 | Naganuma |
| 2003/0001856 A1 | 1/2003 | Sawada et al. |
| 2004/0201582 A1 | 10/2004 | Mizukoshi et al. |
| 2005/0184981 A1 | 8/2005 | Aoki et al. |
| 2006/0007353 A1 | 1/2006 | Matsutani et al. |

FOREIGN PATENT DOCUMENTS

| | | |
|---|---|---|
| JP | 08-138558 | 5/1996 |
| JP | 09-154042 | 6/1997 |
| JP | 10-208637 | 8/1998 |
| JP | 10-319926 | 12/1998 |
| JP | 11-075112 | 3/1999 |
| JP | 2000-029449 | 1/2000 |
| JP | 2000-172218 | 6/2000 |
| JP | 2001-134226 | 5/2001 |
| JP | 2001-189945 | 7/2001 |
| JP | 2002-010286 | 1/2002 |
| KR | 1993-0011182 | 2/1992 |
| KR | 1996-36607 | 10/1996 |

* cited by examiner

| No. | MAX REGION ① | MAX REGION ② | MAX REGION ③ | APL REGION ① | APL REGION ② | APL REGION ③ | APL REGION ④ | GAIN DECREASE | GAIN KEEP | GAIN INCREASE |
|---|---|---|---|---|---|---|---|---|---|---|
| 1 | ○ | | | ○ | | | | ○ | | |
| 2 | ○ | | | | ○ | | | ○ | | |
| 3 | ○ | | | | | ○ | | | ○ | |
| 4 | ○ | | | | | | ○ | | | ☆ |
| 5 | | ○ | | ○ | | | | | ○ | |
| 6 | | ○ | | | ○ | | | | ○ | |
| 7 | | ○ | | | | ○ | | | ○ | |
| 8 | | ○ | | | | | ○ | | | ☆ |
| 9 | | | ○ | ○ | | | | | ○ | |
| 10 | | | ○ | | ○ | | | | | ○ |
| 11 | | | ○ | | | ○ | | | | ○ |
| 12 | | | ○ | | | | ○ | | | ○ |

FIG. 3(b)

| ACTION | MARK | CONTROL |
|---|---|---|
| DECREASE | ○ | DECREASE THE GAIN. MIN. GAIN IS 0. |
| KEEP | ○ | KEEP THE CURRENT GAIN. |
| INCREASE | ○ | INCREASE THE GAIN. MAX. GAIN IS ADJUSTED BY SERVICE CONDITIONS. |
| INCREASE | ☆ | INCREASE THE GAIN IF THE CURRENT GAIN IS LOWER THAN A VALUE SPECIFIED. KEEP THE GAIN IF IT IS EQUAL TO OR HIGHER THAN THE VALUE SPECIFIED. |

CONTRAST ADJUSTING CIRCUITRY AND VIDEO DISPLAY APPARATUS USING SAME

RELATED APPLICATION

This application is a continuation of application Ser. No. 11/655,869, filed Jan. 22, 2007 now U.S. Pat. No. 7,701,475, which is a continuation of application Ser. No. 11/258,994, filed Oct. 27, 2005, now U.S. Pat. No. 7,227,543, which is a continuation of application Ser. No. 11/102,771, filed Apr. 11, 2005, now U.S. Pat. No. 7,151,535, which is a continuation of Ser. No. 10/295,033, filed Nov. 15, 2002, now U.S. Pat. No. 6,982,704, which claims priority from JP 2002-104383, filed on Apr. 5, 2002; the disclosures of which are incorporated herein by reference.

BACKGROUND OF THE INVENTION

The present invention relates to a technique for converting an analog video signal such as a television broadcasting signal or such signal input from a personal computer or the like into a digital video signal and displaying video images on a display unit such as a plasma display panel (PDP) and a liquid crystal display panel.

A generally known problem of a video display unit using a device comprising fixed pixels in a matrix, such as a PDP and a liquid crystal display panel, is that the contrast of a video image displayed on it is inferior to that displayed on a video display unit using a Braun tube or cathode ray tubes. As regards the PDP, attempts to enhance the contrast have heretofore been made, including increasing the light emission efficiency of the phosphors and improved light emission driving methods or structural improvements. Such approaches are described in detail in Japanese Unexamined Patent Publication No. Hei 10 (1998)-208637, No. Hei 8 (1996)-138558, and other publications.

SUMMARY OF THE INVENTION

The video display unit using a device comprising fixed pixels in a matrix, such as a PDP and a liquid crystal display panel, is required to display higher contrast video images.

In view of the prior art, a problem to be challenged by the present invention is making it possible to offer stable and high contrast video images.

The object of the present invention is to provide a technique by which the above problem can be solved.

To solve the foregoing problem, in one implementation of the present invention, contrast adjusting circuitry for use in a video display apparatus which converts analog video signals to digital video signals and displays video images is provided. The contrast adjusting circuitry includes amplifying means and A/D conversion means for analog-to-digital conversion of video signals amplified by the amplifying means. The contrast adjusting circuitry is constructed to perform a contrast adjustment by changing the gain made by the amplifying means, based on maximum picture level data and average picture level data for analog-to-digital converted luminance signals.

DETAILED DESCRIPTION OF PREFERRED EMBODIMENTS

The present invention now is described fully hereinafter with reference to the accompanying drawings, in which preferred embodiments of the invention are shown.

Figure 1:
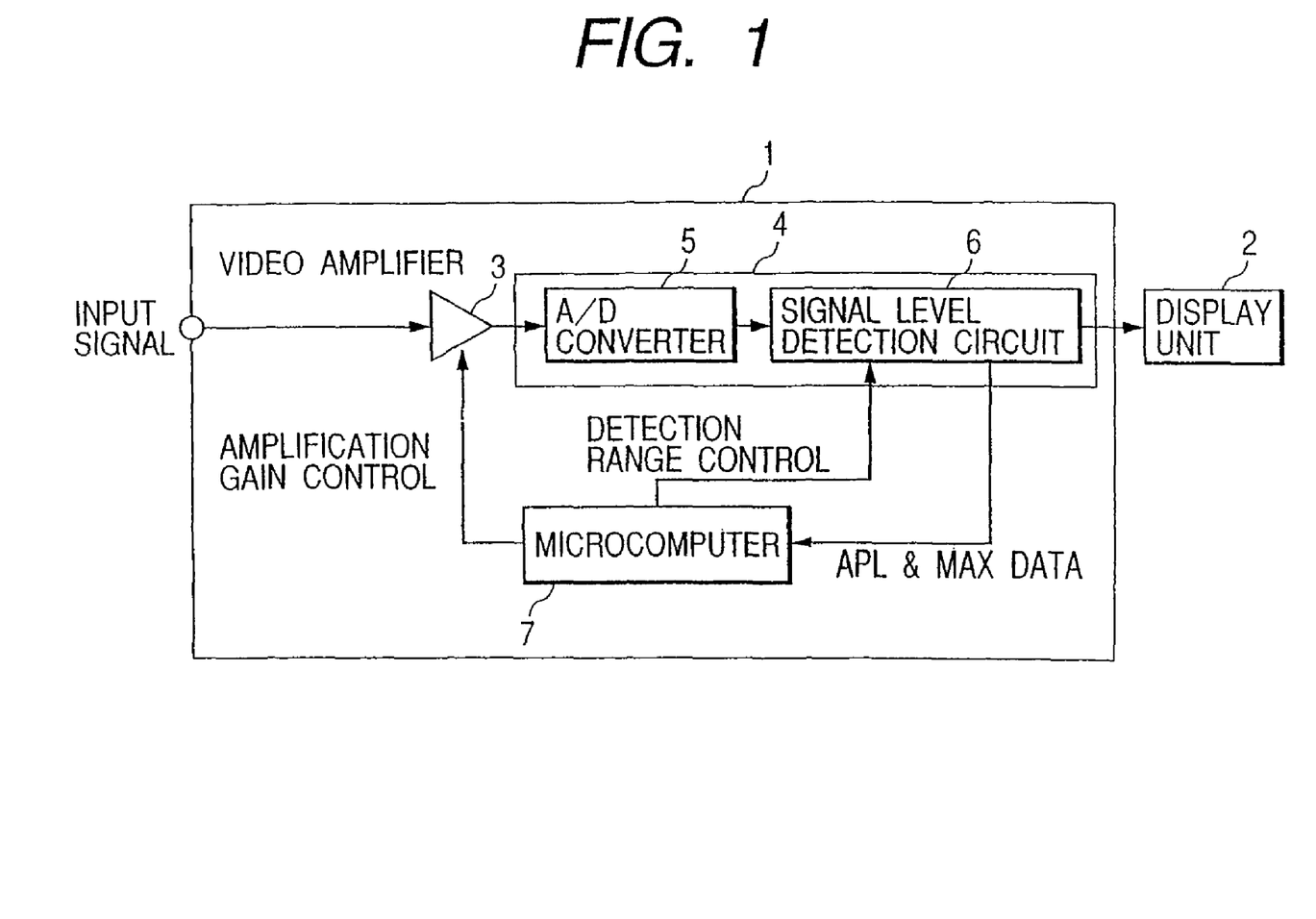
FIG. 1 is a block diagram showing a basic configuration of contrast adjusting circuitry of the present invention.
Figure 2A:
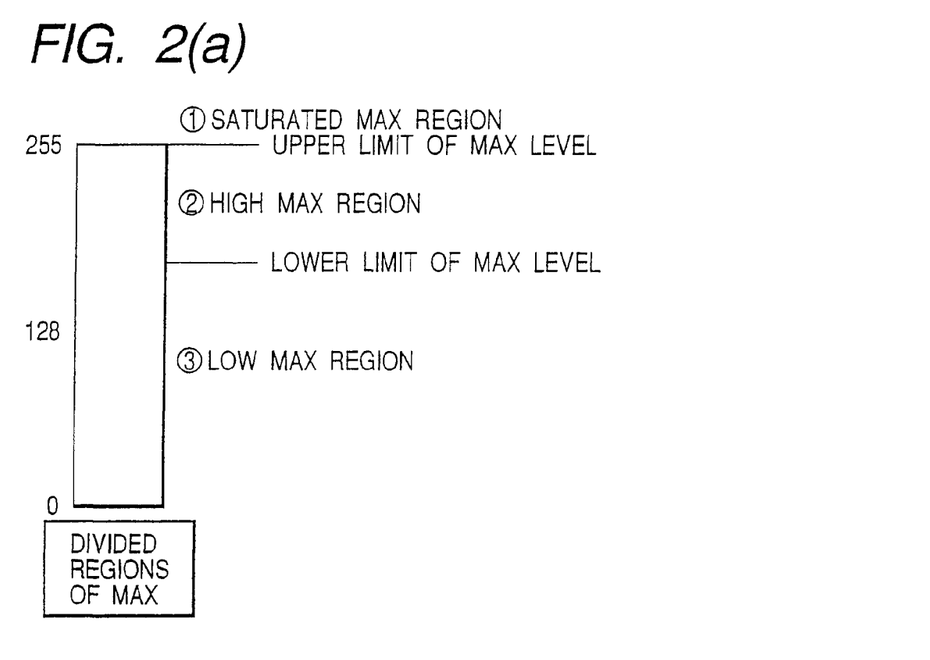
FIG. 2A depicts divided luminance regions predefined for a maximum picture level and FIG. 2B depicts divided luminance regions predefined for an average picture level.
Figure 2B:
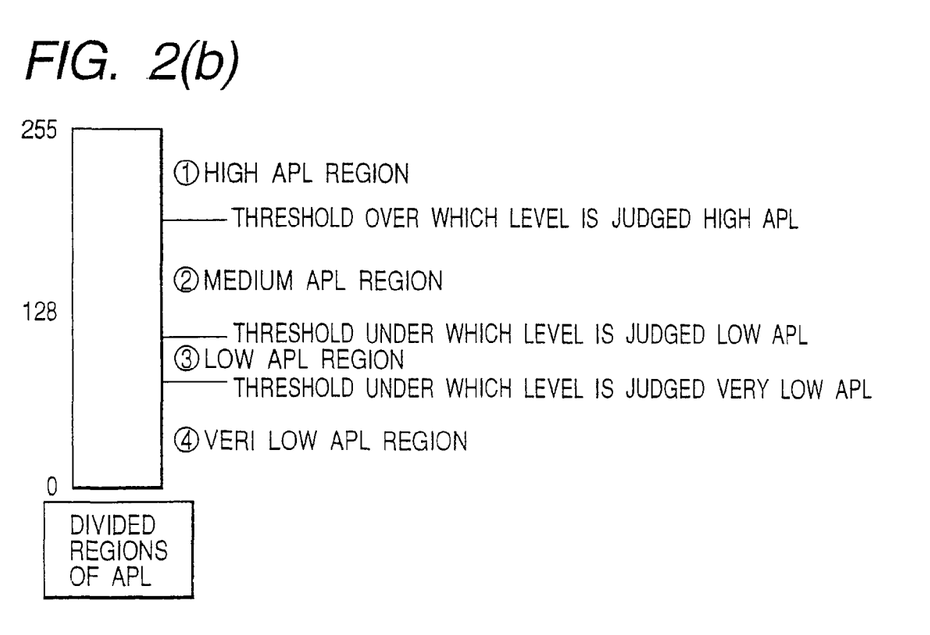
Figure 3A:
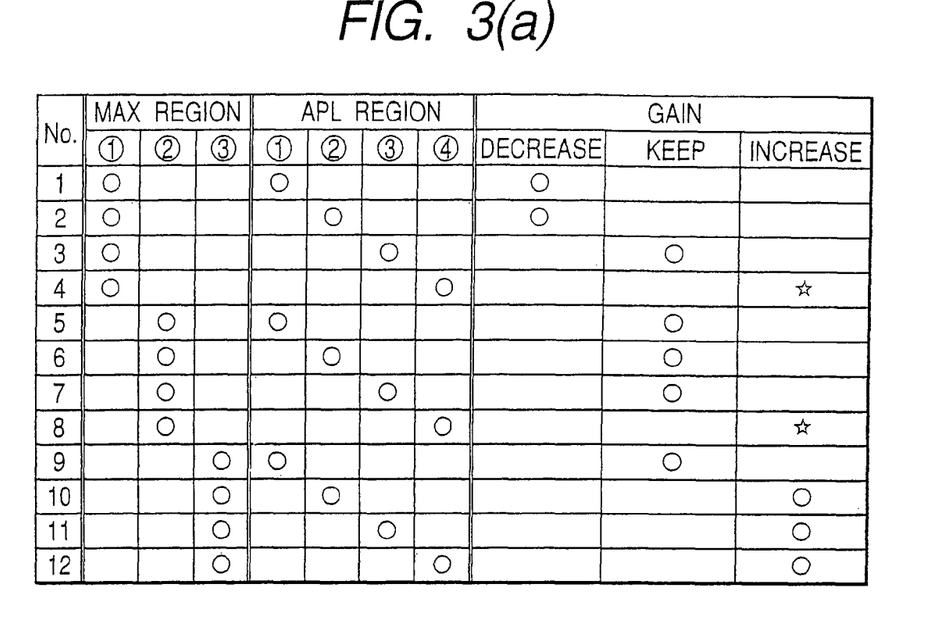
FIG. 3A shows a table containing possible cases of combinations of the divided luminance regions with what gain control to be applied for each combination and FIG. 3B shows a table describing the details of gain control.
Figure 3B:
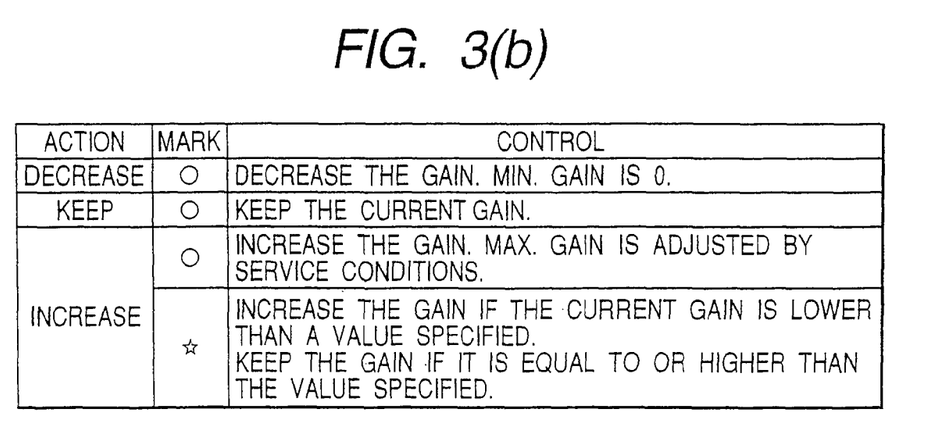
Figure 4:
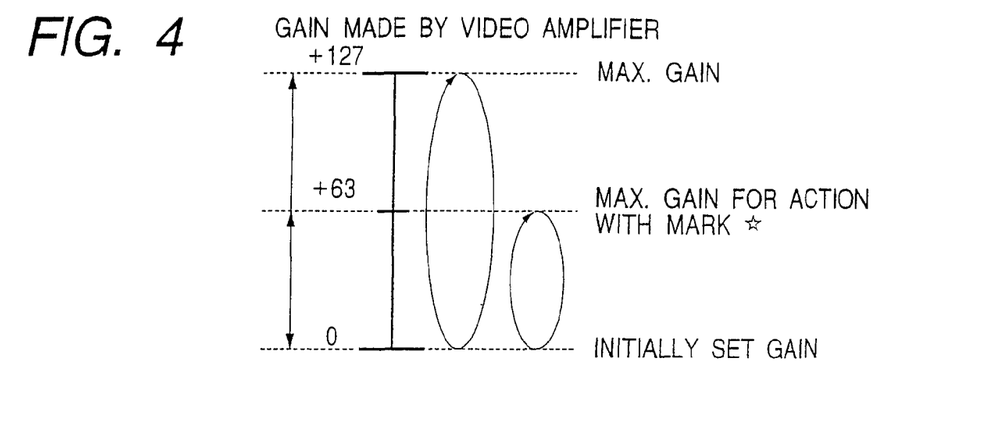
FIG. 4 depicts a range of gain control by contrast adjustment.
Figure 5A:
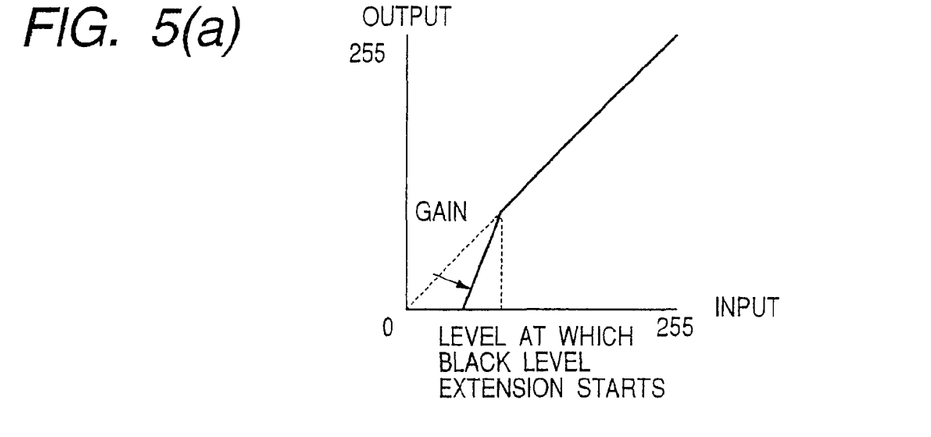
FIG. 5A and FIG. 5B are graphs for explaining a black level extension function.
Figure 5B:
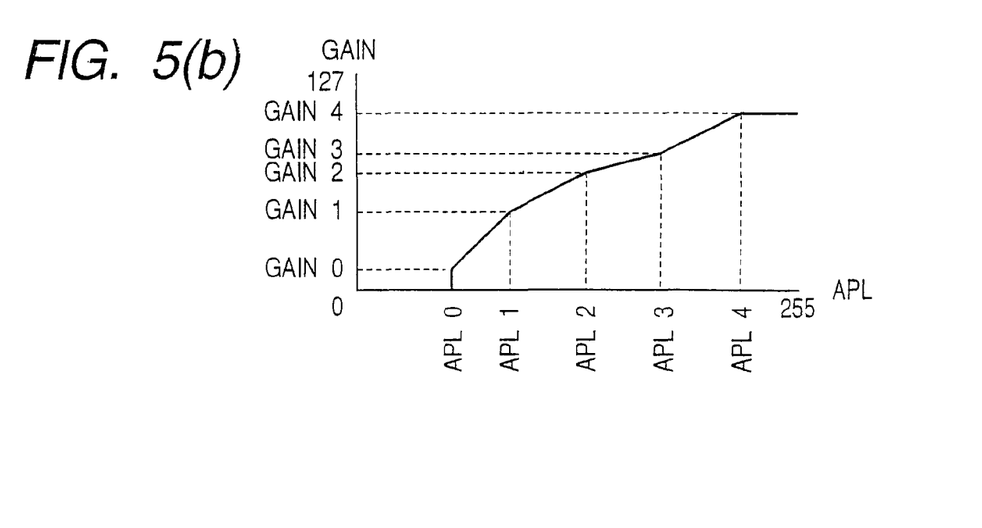
Figure 6:
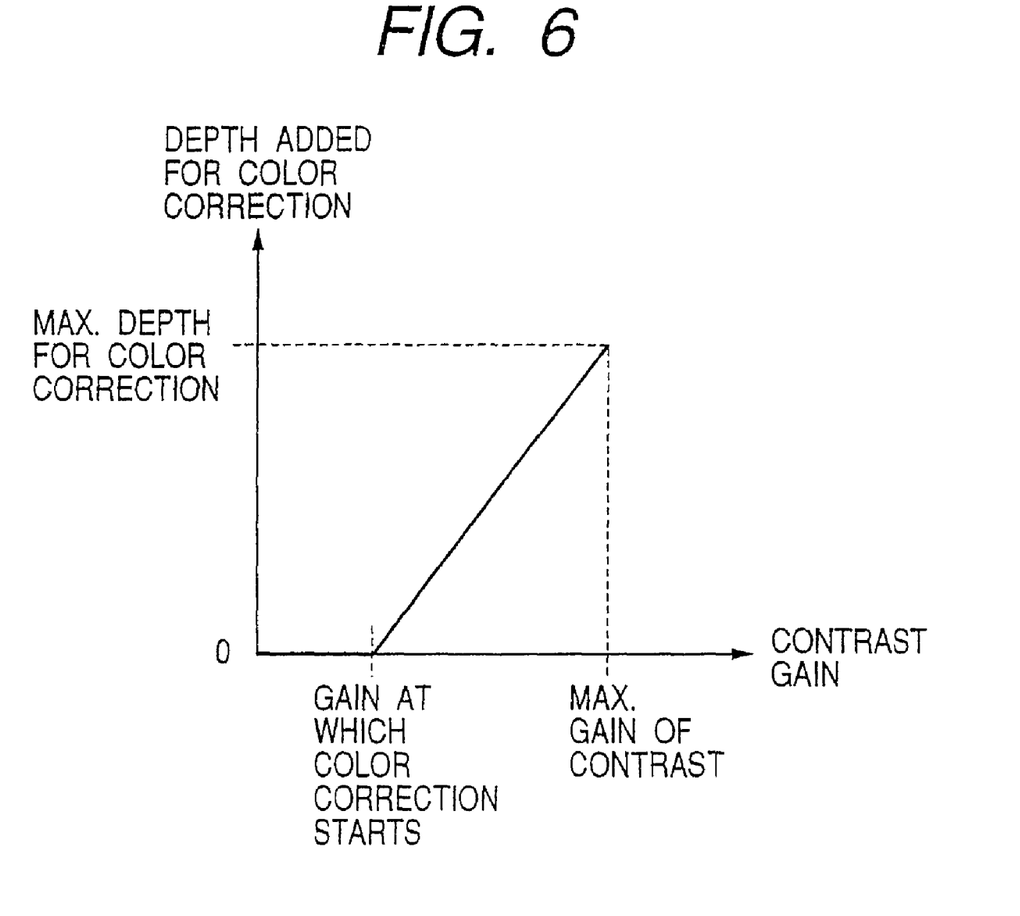
FIG. 6 is a graph for explaining color correction concurring with contrast adjustment.
Figure 7:
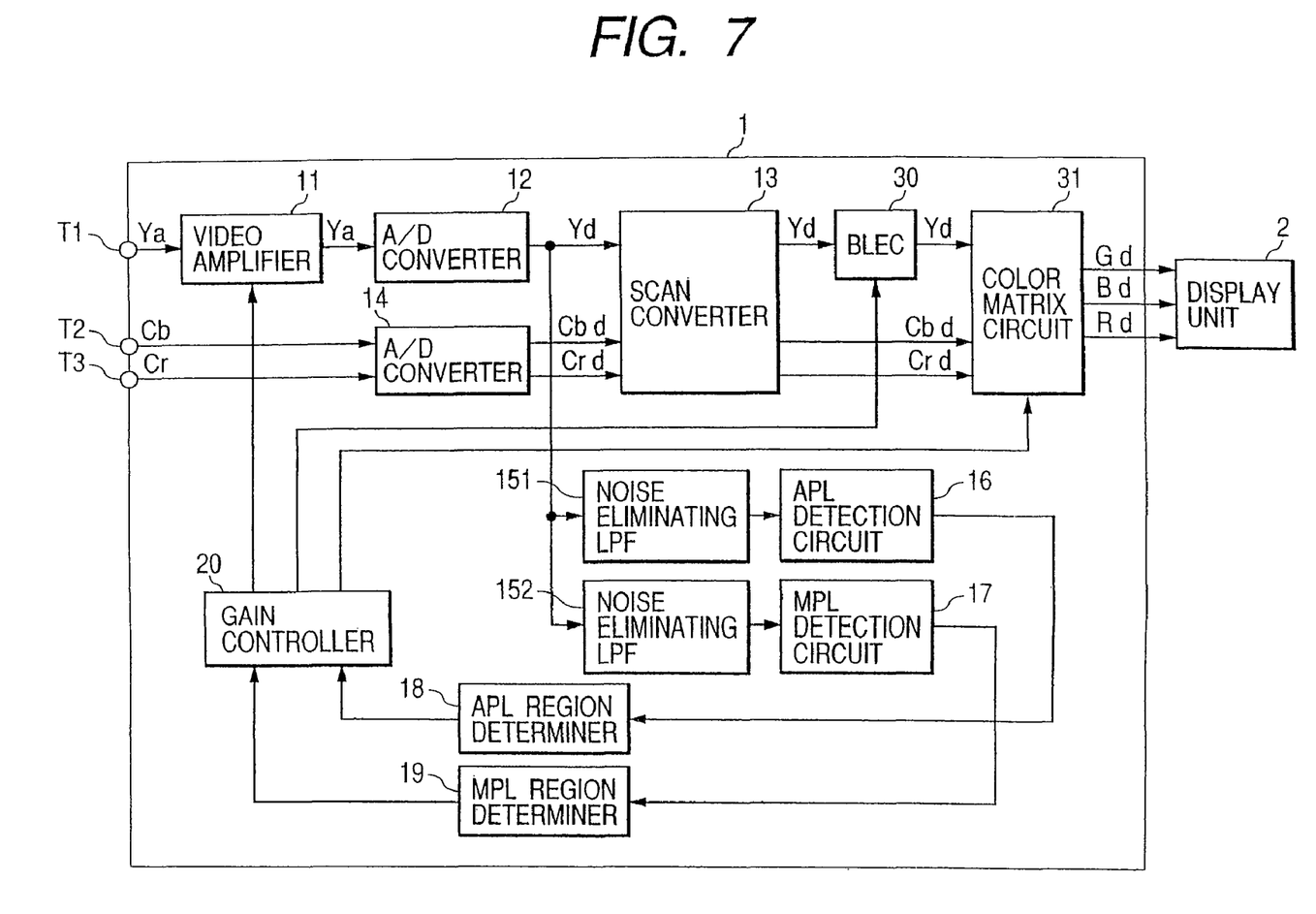
FIG. 7 is a block diagram showing a configuration example of contrast adjusting circuitry as Embodiment 1 of the invention.

FIGS. 1 to 8 are provided for explaining a preferred Embodiment 1 of the present invention. FIG. 1 shows a basic configuration of contrast adjusting circuitry of the present invention. FIG. 2A depicts divided luminance regions predefined for a maximum picture level and FIG. 2B depicts divided luminance regions predefined for an average picture level. FIG. 3A shows a table containing possible cases of combinations of the divided luminance regions with what gain control to be applied for each combination and FIG. 3B shows a table describing the details of gain control. FIG. 4 depicts a range of gain control by contrast adjustment. FIG. 5A and FIG. 5B are graphs for explaining a black level extension function. FIG. 6 is a graph for explaining color correction concurrent with contrast adjustment. FIG. 7 shows a configuration of contrast adjusting circuitry as Embodiment 1 of the invention. FIG. 8A and FIG. 8B depict the effects of contrast adjustment.

Embodiment 1 of the invention illustrates the contrast adjusting circuitry that detects maximum and average picture levels of analog-to-digital converted luminance signals for a predetermined period, determines one of the predefined luminance regions within which the maximum picture level falls and one of the predefined luminance regions within which the average picture level falls, and, based on the thus determined luminance regions of both maximum and average picture levels, carries out analog luminance signal gain control before A/D conversion, black level extension processing for digital luminance signals after A/D conversion, and color correction for digital color signals.

In FIG. 1, reference number 1 denotes the contrast adjusting circuitry; 2 denotes a display unit that displays video images in color from contrast-adjusted video signals; 3 denotes a video amplifier that amplifies analog luminance signals input to the circuitry; 4 denotes a circuit block in which digital signals are obtained and their picture levels are detected; 5 denotes an A/D converter that converts analog signals to digital signals; 6 denotes a signal level detection circuit that detects maximum and average picture levels of digital luminance signals for a predetermined period; and 7 denotes a microcomputer that determines one of the predefined luminance regions within which the detected maximum picture level falls and one of the predefined luminance regions within which the detected average picture level falls and generates and outputs a control signal, according to the thus determined luminance regions of the maximum and average picture levels. Input analog luminance signals, after being amplified by the video amplifier 3, are converted to digital luminance signals by the A/D converter 5 and input to the signal level detection circuit 6.

The signal level detection circuit 6 detects maximum and average picture levels of the digital luminance signals for a period of, for example, one field or one frame of video image. The thus detected maximum and average picture levels (signals) are input to the microcomputer 7. Based on the maximum and average picture level input data, the microcomputer 7 determines one of the predefined luminance regions within which the maximum picture level falls and one of the predefined luminance regions within which the average picture level falls. Based on the thus determined luminance regions of the maximum and average picture levels, the microcomputer 7 generates and outputs a control signal. The control signal is input to the video amplifier 3 and, by this signal, the amplification gain of analog luminance signals in the video amplifier 3 is controlled. By the control of the amplification gain of analog luminance signals, the gain of the digital luminance signals obtained after A/D conversion of the analog signals changes. As a result, contrast-adjusted video images are displayed on the screen of the display unit 2.

Although not shown in FIG. 1, other output paths of the control signal from the microcomputer 7 to a black level extension circuit and a color matrix circuit are provided in the detailed contrast adjusting circuitry according to Embodiment 1 of the invention (FIG. 7). The black level extension circuit performs black level extension processing for digital luminance signals. The color matrix circuit converts digital luminance signals and digital color (difference) signals into red (R), green (G), and blue (B) digital video signals. Based on the luminance region data for the average picture level, the black level extension circuit carries out black level extension processing and the color matrix circuit carries out color correction (color depth control).

FIG. 2A depicts divided luminance regions predefined for the maximum picture level and FIG. 2B depicts divided luminance regions predefined for the average picture level. Assuming that the A/D converter processes 8-bit luminance signals and the highest tone level is 255 that is the upper limit of the maximum picture level, as shown in FIG. 2A, for example, the maximum picture level is divided into three MAX regions: saturated luminance region ((1) saturated MAX region), high luminance region ((2) high MAX region), and low luminance region ((3) low MAX region). The saturated luminance region ((1) saturated MAX region) is beyond the upper limit of the maximum picture level. The high luminance region ((2) high MAX region) is between the lower limit and the upper limit of the maximum picture level. The low luminance region ((3) low MAX region) is between the lowest tone level of 0 and the lower limit of the maximum picture level. Assuming that the A/D converter processes 8-bit luminance signals, as shown in FIG. 2B, for example, the average picture level between the highest tone level of 255 and the lowest tone level of 9 is divided into four APL regions: high average luminance region ((1) high APL region), medium average luminance region ((2) medium APL region), low average luminance region ((3) low APL region), and very low average luminance region ((4) very low APL region). The maximum picture level and the average picture level detected by the signal level detection circuit 6 in FIG. 1 respectively fall within one of the above luminance regions predefined for each level and what region within which each picture level falls is determined by the microcomputer 7.

FIG. 3A shows a table containing possible cases of combinations of the divided luminance regions with what gain control to be applied for each case. The table of FIG. 3A contains exemplary 12 combinations of a luminance region of MAX picture level and a luminance region of APL with what gain control, decrease, keep, or increase to be applied for each combination. The table of FIG. 3B describes the detail of gain control. In the No. 1 to No. 4 cases, the maximum picture level falls within the saturated luminance region ((1) saturated MAX region). In the No. 5 to No. 8 cases, the maximum picture level falls within the high luminance region ((2) high MAX region). In the No. 9 to No. 12 cases, the maximum picture level falls within the low luminance region ((3) low MAX region). For the No. 1 case, the maximum picture level falls within the saturated luminance region ((1) saturated MAX region), while the average picture level falls within the high average luminance region ((1) high APL region). For the No. 2 case, the maximum picture level falls within the saturated luminance region ((1) saturated MAX region), while the average picture level falls within the medium average luminance region ((2) medium APL region). For these two cases, the microcomputer 7 exerts control to decrease the gain in order to prevent saturation of the display if the gain made by the video amplifier 3 is increased by the contrast adjusting function. For the No. 3 case where the maximum picture level falls within the saturated luminance region ((1) saturated MAX region), whereas the average picture level falls within the low average luminance region ((3) low APL region), the microcomputer 7 exerts control to keep the gain made by the video amplifier 3. For the No. 4 case where the maximum picture level falls within the saturated luminance region ((1) saturated MAX region), whereas the average picture level falls within the very low average luminance region ((4) very low APL region), the microcomputer 7 exerts control to increase the gain made by the video amplifier 3. In the No. 5 case, the maximum picture level falls within the high luminance region ((2) high MAX region), while the average picture level falls within the high average luminance region ((1) high APL region). In the No. 6 case, the maximum picture level falls within the high luminance region ((2) high MAX region), while the average picture level falls within the medium average luminance region ((2) medium APL region). In the No. 7 case, the maximum picture level falls within the high luminance region ((2) high MAX region), while the average picture level falls within the low average luminance region ((3) low APL region). For these three cases No. 4 to No. 7, the microcomputer 7 exerts control to keep the gain made by the video amplifier 3. For the No. 8 case where the maximum picture level falls within the high luminance region ((2) high MAX region), whereas the average picture level falls within the very low average luminance region ((4) very low APL region), the microcomputer 7 exerts control to increase the gain made by the video amplifier 3. For the No. 9 case where the maximum picture level falls within the low luminance region ((3) low MAX region), whereas the average picture level falls within the high average luminance region ((1) high APL region), the microcomputer 7 exerts control to keep the gain made by the video amplifier 3. In the No. 10 case, the maximum picture level falls within the low luminance region ((3) low MAX region), while the average picture level falls within the medium average luminance region ((2) medium APL region). In the No. 11 case, the maximum picture level falls within the low luminance region ((3) low MAX region), while the average picture level falls within the low average luminance region ((3) low APL region). In the No. 12 case, the maximum picture level falls within the low luminance region ((3) low MAX region), while the average picture level falls within the very low average luminance region ((4) very low APL region). For these three cases No. 10 to No. 12, the microcomputer 7 exerts control to increase the gain made by the video amplifier 3. In the above, the gain can be decreased, to the maximum, down to a gain that was set initially.

FIG. 4 depicts a range of gain control by the foregoing contrast adjustment. In FIG. 4, an example of a gain control range is shown with 128 steps of gain from 0 to 127. Gain increase or decrease takes place, for example, in the range between the maximum gain and the gain initially set for the gain made by the video amplifier 3. The gain control range changes to another range for the No. 4 and No. 8 cases in the table of FIG. 3A. For other cases, the full gain control range applies. For the No. 4 and No. 8 cases, a half gain control range applies. This is intended to prevent saturation (white saturation) of displayed video images by excessively high gains because the gain increases regardless of the detected maximum picture level in the cases of No. 4 and No. 8.

FIG. 5A and FIG. 5B are graphs for explaining a black level extension function used to render video images with a sharper black. The graph of FIG. 5A shows a relationship between the input level and the output level of luminance signals when black level extension is performed. The graph of FIG. 5B shows a relationship between the average picture levels (APLs) of input luminance signals and the gains controlled. Black level extension is set to start at a gain level under which the output level of input luminance signals is depressed. In the present invention, the output level depression is controlled by gain and the gain is controlled, based on the average picture level (APL). In this example, as the average picture level (APL) rises, the gain rises, and the output level falls rapidly below the gain level at which black level extension starts.

FIG. 6 is a graph for explaining color correction concurrent with contrast adjustment.

Because the contrast adjustment increases the gain of luminance signals only, resultant video images are characterized in that the color depth decreases as the gain increases. To avoid this, color correction to increase the color depth of video images in proportion as the gain increases is carried out. For example, the color correction is carried out by following a characteristic line shown in FIG. 6. A gain at which color correction starts, a maximum gain of contrast, and a maximum depth for color correction are set and a declined color correction characteristic line is plotted. For color correction, color depth per gain of contrast is determined by the characteristic line. In this way, decrease in color depth is prevented when contrast adjustment is performed.

FIG. 7 shows a configuration example of contrast adjusting circuitry as Embodiment 1 of the invention.

In FIG. 7, reference number 1 denotes the contrast adjusting circuitry; and 2 denotes a display unit that displays video images. As the display unit, a PDP, liquid crystal display panel, or the like may be used. Reference number 11 denotes a video amplifier that amplifies an analog luminance signal Ya input to the circuitry; 12 denotes an A/D converter that converts the amplified analog luminance signal Ya to a digital luminance signal Yd; 13 denotes a scan converter that converts input signals to signals with timing adjusted to be displayable by the display unit; and 14 denotes an A/D converter that converts analog color (color difference) signals Cb, Cr input to the circuitry to digital color (color difference) signals Cbd, Crd. Reference numbers 151 and 152 denote noise eliminating LPFs that are low-pass filters for eliminating noise from digital luminance signals Yd output by the A/D converter. Reference number 16 denotes an APL detection circuit that detects an average picture level of digital luminance signals output by the noise eliminating LPF 151 for a predetermined period, for example, one frame or one field. Reference number 17 denotes an MPL detection circuit that detects a maximum picture level (MPL) of digital luminance signals output by the noise eliminating LPF 152 for a predetermined period, for example, one frame or one field. Reference number 18 denotes an APL region determiner to which the data (signal) of the average picture level detected by the APL detection circuit 16 is input. The APL region determiner determines one of the predefined luminance regions within which the average picture level falls. Reference number 19 denotes an MPL region determiner to which the data (signal) of the maximum picture level detected by the MPL detection circuit 17 is input. The MPL region determiner determines one of the predefined luminance regions within which the maximum picture level falls. Reference number 20 denotes a gain controller that generates a control signal for controlling the gain made by the video amplifier 11 and other control signals, based on the data of what luminance region within which the average picture level falls and what luminance region within which the maximum picture level falls. Reference number 30 denotes a black level extension circuit that carries out black level extension processing. Reference number 31 denotes a color matrix circuit that converts the digital luminance signal Yd and digital color (color difference) signals Cbd, Crd into red (R), green (G), and blue (B) digital video signals Rd, Gd, and Bd. Terminal T1 is an input terminal for analog luminance signals Ya. Terminals T2 and T3 are input terminals for analog color (color difference) signals Cb and Cr, respectively. Among the above-mentioned components, the APL region determiner 18, MPL region determiner 19, and gain controller 20 may be integrated into a single entity of hardware, for example, a microcomputer. The A/D converters 12, 14, scan converter 13, noise eliminating LPFs 151, 152, APL detection circuit 16, MPL detection circuit 17, black level extension circuit 30, and color matrix circuit 31 may be integrated into a single entity of hardware, for example, an LSI (large scale integrated circuit).

In the contrast adjusting circuitry of FIG. 7, an analog luminance signal Ya input at the input terminal T1 is amplified by the video amplifier 11 and converted to a digital luminance signal Yd by the A/D converter 12. The digital luminance signal Yd is input to the scan converter 13 and the noise eliminating LPFs 151 and 152. Digital luminance signals from which noise was eliminated by the noise eliminating LPFs 151 and 152 are input to the APL detection circuit 16 and MPL detection circuit 17. The APL detection circuit 16 detects an average picture level of digital luminance signals input to it for a predetermined period. The MPL detection circuit 17 detects a maximum picture level of digital luminance signals input to it for a predetermined period. The thus detected APL and MPL data are respectively input to the APL region determiner 18 and MPL region determiner 19. The APL region determiner 18 determines what luminance region within which the detected average picture level falls. The MPL region determiner 19 determines what luminance region within which the detected maximum picture level falls. Specifically, for instance, the APL region determiner determines one of the four APL regions within which the detected average picture level falls. The four APL regions are, as described for FIG. 2, high average luminance region ((1) high APL region), medium average luminance region ((2) medium APL region), low average luminance region ((3) low APL region), and very low average luminance region ((4) very low APL region). The MPL region determiner determines one of the three regions within which the detected maximum picture level falls. The three regions are, as described for FIG. 2, saturated luminance region ((1) saturated MAX region), high luminance region ((2) high MAX region), and low luminance region ((3) low MAX region). The data of the thus determined luminance region within which the average picture level falls and the data of the thus determined luminance region within which the maximum picture level falls are input to the gain controller 20. At the same time, the average picture level used in determining the luminance region is also input from the APL region determiner 18 to the gain controller. Based on the luminance region data and the average picture level, the gain controller 20 generates first, second, and third control signals. The first control signal is a signal for controlling the gain made by the video amplifier 11, thus adjusting the contrast. For example, this control signal is generated, based on the possible cases of combinations of the luminance region within which the detected average picture level falls and the luminance region within which the detected maximum picture level falls, which are illustrated in FIG. 3. The second control signal is input to the black level extension circuit 30, causing the circuit to carry out black level processing. This control signal is generated, based on the detected average picture level. The third control signal is input to the color matrix circuit 31 for color depth correction of digital color (color difference) signals. This control signal is generated, based on the gain for contrast adjustment made by the first control signal. On the other hand, analog color (color difference) signals Cb and Cr input at the input terminals T2 and T3 are also converted to digital color (color difference) signals Cbd and Crd by the A/D converter 14, input to the scan converter 13 as the digital luminance signal Yd is done, and subjected to pixel conversion. The digital luminance signal Yd output from the scan converter 13 is input to the black level extension circuit 30 where it is subjected to black level extension processing controlled by the second control signal. The thus black level extended digital luminance signal Yd is further input to the color matrix circuit 31. To the color matrix circuit 31, the digital color (color difference) signals Cbd and Crd output from the scan converter 13 are also input. The color matrix circuit 31 converts the digital luminance signal Yd and digital color (color difference) signals Cbd and Crd into red (R), green (G), and blue (B) digital video signals Rd, Gd, and Bd which are, in turn, output to the display unit. The contrast adjusting circuitry of FIG. 7 constitutes a part of a video display apparatus. The digital video signals Rd, Gd, and Bd output from the color matrix circuit in FIG. 7 are input to the display unit 2 and video images reproduced from them are displayed on the screen of the display unit 2.

Figure 8A:
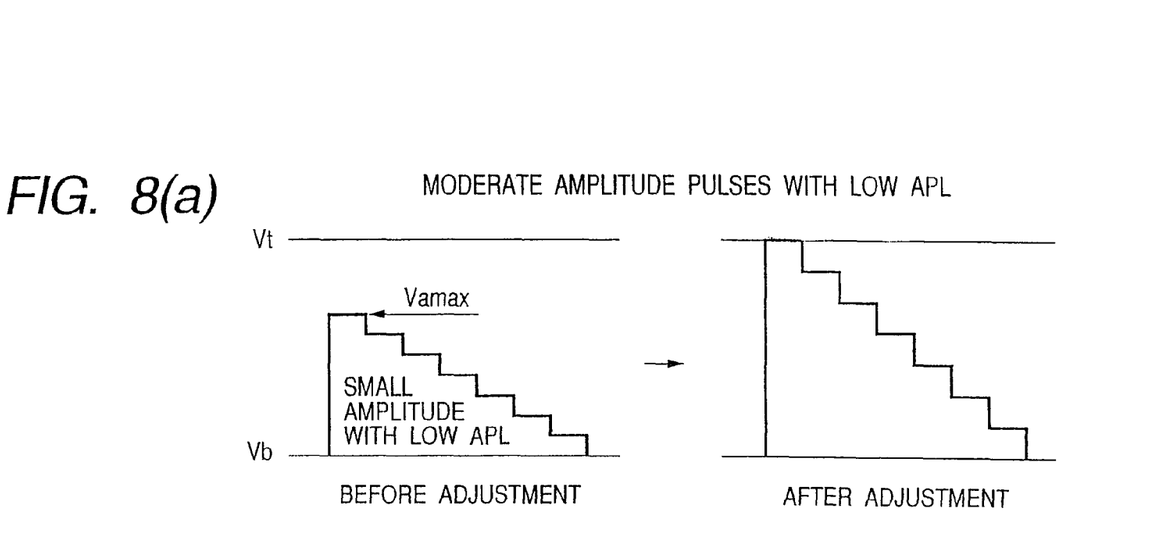
FIG. 8A and FIG. 8B depict the effects of contrast adjustment.
Figure 8B:
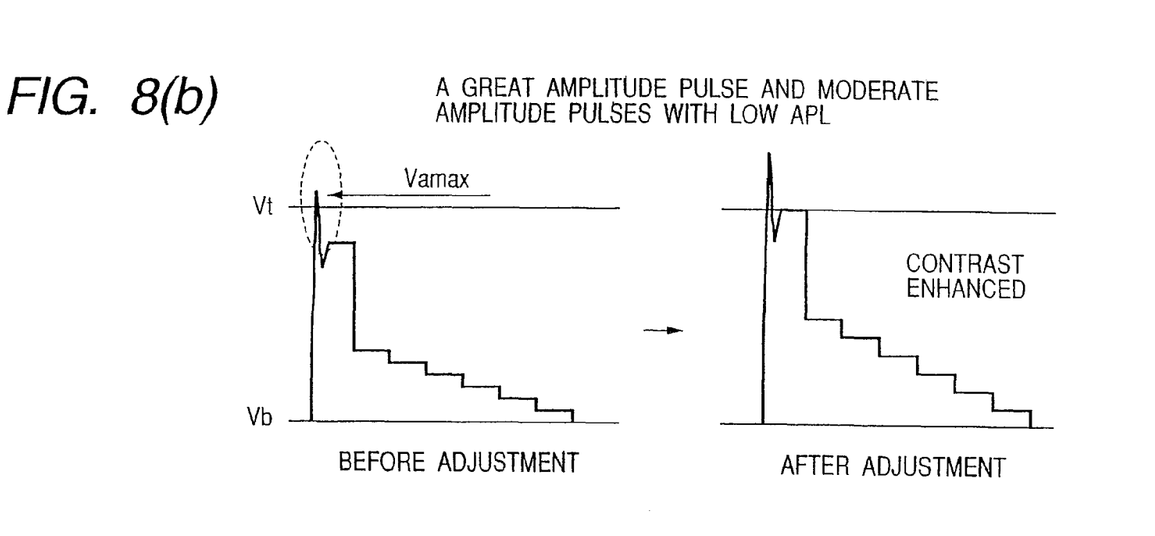

FIG. 8A and FIG. 8B depict the effects of contrast adjustment. FIG. 8A and FIG. 8B both show examples of analog luminance signal waveforms. FIG. 8A illustrates analog luminance signals characterized by moderate amplitude pulses with a low average picture level. FIG. 8B illustrates analog luminance signals characterized by a great amplitude pulse and moderate amplitude pulses with a low average picture level. In FIG. 8A, the amplitude of all pulses is moderate with a small average picture level, and therefore, by increasing the amplitude of the entire waveform, the average picture level rises. This represents the No. 10 to No. 12 cases in FIG. 3. In FIG. 8B, a pulse of great amplitude appears in a very small waveform portion (first waveform), but the amplitude of other most portions of the waveform (second waveform) is moderate, and therefore, by increasing the amplitude of the second waveform without regard to the peak picture level, the average picture level rises. This represents the No. 4 case in FIG. 3.

According to Embodiment 1 described hereinbefore, the contrast of video images to be displayed can be adjusted, according to the detected maximum and average picture levels, and, consequently, stable and high contrast video images can be reproduced. Decrease in color depth can be prevented. Moreover, by black level extension processing, video images with a sharper black are reproduced.

Figure 9:
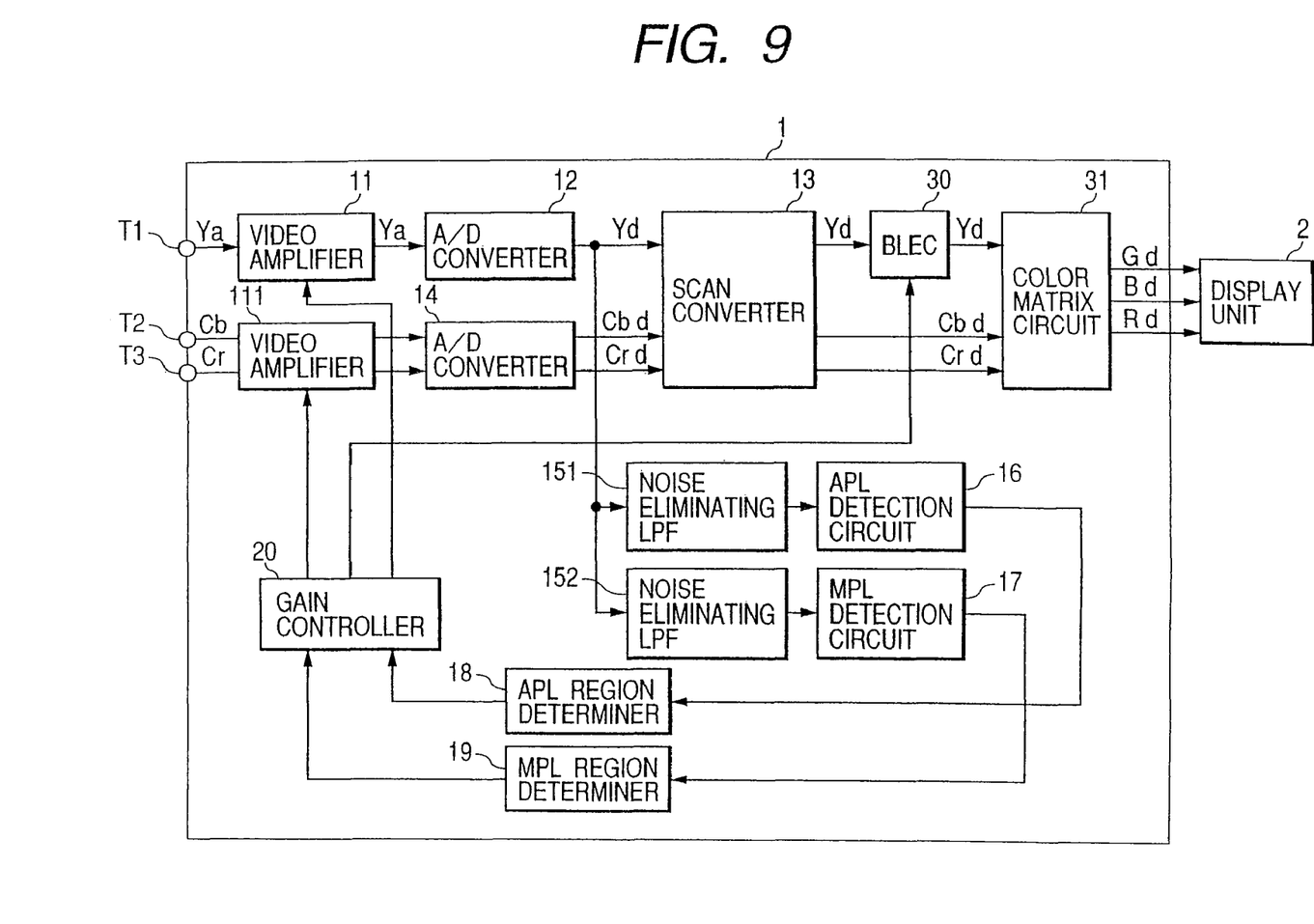
FIG. 9 is a block diagram showing a configuration example of contrast adjusting circuitry as Embodiment 2 of the invention.

FIG. 9 is a block diagram depicting a preferred Embodiment 2 of the present invention, the diagram showing a configuration example of contrast adjusting circuitry of Embodiment 2.

Embodiment 2 of the invention illustrates the contrast adjusting circuitry that detects maximum and average picture levels of analog-to-digital converted luminance signals for a predetermined period, determines one of the predefined luminance regions within which the maximum picture level falls and one of the predefined luminance regions within which the average picture level falls, and, based on the thus determined luminance regions of both maximum and average picture levels, carries out analog luminance signal gain control before A/D conversion, analog color (color difference) signal gain control before A/D conversion, and black level extension processing for digital luminance signals after A/D conversion.

In FIG. 9, reference number 1 denotes the contrast adjusting circuitry; and 2 denotes a display unit that displays video images. As the display unit, a PDP, liquid crystal display panel, or the like may be used. Reference number 11 denotes a video amplifier that amplifies an analog luminance signal Ya input to the circuitry; 12 denotes an A/D converter that converts the amplified analog luminance signal Ya to a digital luminance signals Yd; 13 denotes a scan converter that converts input signals to signals with timing adjusted to be displayable by the display unit; 111 denotes a video amplifier that amplifies analog color (color difference) signals Cb, Cr input to the circuitry and 14 denotes an A/D converter that converts the amplified analog color (color difference) signals Cb, Cr to digital color (color difference) signals Cbd, Crd. Reference numbers 151 and 152 denote noise eliminating LPFs that are low-pass filters for eliminating noise from digital luminance signals Yd output by the A/D converter. Reference number 16 denotes an APL detection circuit that detects an average picture level of digital luminance signals output by the noise eliminating LPF 151 for a predetermined period, for example, one frame or one field. Reference number 17 denotes an MPL detection circuit that detects a maximum picture level (MPL) of digital luminance signals output by the noise eliminating LPF 152 for a predetermined period, for example, one frame or one field. Reference number 18 denotes an APL region determiner to which the data (signal) of the average picture level detected by the APL detection circuit 16 is input. The APL region determiner determines one of the predefined luminance regions within which the average picture level falls. Reference number 19 denotes an MPL region determiner to which the data (signal) of the maximum picture level detected by the MPL detection circuit 17 is input. The MPL region determiner determines one of the predefined luminance regions within which the maximum picture level falls. Reference number 20 denotes a gain controller that generates a control signal for controlling the gain made by the video amplifier 11 and other control signals, based on the data of what luminance region within which the average picture level falls and what luminance region within which the maximum picture level falls. Reference number 30 denotes a black level extension circuit that carries out black level extension processing. Reference number 31 denotes a color matrix circuit that converts the digital luminance signal Yd and digital color (color difference) signals Cbd, Crd into red (R), green (G), and blue (B) digital video signals Rd, Gd, and Bd. Terminal T1 is an input terminal for analog luminance signals Ya. Terminals T2 and T3 are input terminals for analog color (color difference) signals Cb and Cr, respectively. In Embodiment 1 also, among the above-mentioned components, the APL region determiner 18, MPL region determiner 19, and gain controller 20 may be integrated into a single entity of hardware, for example, a microcomputer. The A/D converters 12, 14, scan converter 13, noise eliminating LPFs 151, 152, APL detection circuit 16, MPL detection circuit 17, black level extension circuit 30, and color matrix circuit 31 may be integrated into a single entity of hardware, for example, an LSI (large scale integrated circuit).

In the contrast adjusting circuitry of FIG. 9, an analog luminance signal Ya input at the input terminal T1 is amplified by the video amplifier 11 and converted to a digital luminance signal Yd by the A/D converter 12. The digital luminance signal Yd is input to the scan converter 13 and the noise eliminating LPFs 151 and 152. Digital luminance signals from which noise was eliminated by the noise eliminating LPFs 151 and 152 are input to the APL detection circuit 16 and MPL detection circuit 17. The APL detection circuit 16 detects an average picture level of digital luminance signals input to it for a predetermined period. The MPL detection circuit 17 detects a maximum picture level of digital luminance signals input to it for a predetermined period. The thus detected APL and MPL data are respectively input to the APL region determiner 18 and MPL region determiner 19. The APL region determiner 18 determines what luminance region within which the detected average picture level falls. The MPL region determiner 19 determines what luminance region within which the detected maximum picture level falls. Specifically, for instance, the APL region determiner determines one of the four APL regions within which the detected average picture level falls. The four APL regions are, as described for FIG. 2, high average luminance region ((1) high APL region), medium average luminance region ((2) medium APL region), low average luminance region ((3) low APL region), and very low average luminance region ((4) very low APL region). The MPL region determiner determines one of the three regions within which the detected maximum picture level falls. The three regions are, as described for FIG. 2, saturated luminance region ((1) saturated MAX region), high luminance region ((2) high MAX region) and low luminance region ((3) low MAX region). The data of the thus determined luminance region within which the average picture level falls and the data of the thus determined luminance region within which the maximum picture level falls are input to the gain controller 20. At the same time, the average picture level used in determining the luminance region is also input from the APL region determiner 18 to the gain controller. Based on the luminance region data and the average picture level data, the gain controller 20 generates first, second, and third control signals. The first control signal is a signal for controlling the gain made by the video amplifier 11, thus adjusting the contrast. For example, this control signal is generated, based on the possible cases of combinations of the luminance region within which the detected average picture level falls and the luminance region within which the detected maximum picture level falls, which are illustrated in FIG. 3. The second control signal is input to the black level extension circuit 30, causing the circuit to carry out black level processing. This control signal is generated, based on the detected average picture level data. The third control signal is input to the video amplifier 111 and used for controlling the gain of digital color (color difference) signals. This control signal is generated, based on the gain for contrast adjustment made by the first control signal. On the other hand, analog color (color difference) signals Cb and Cr output from the video amplifier 111 are also converted to digital color (color difference) signals Cbd and Crd by the A/D converter 14 and input to the scan converter 13 as the digital luminance signal Yd is done. The digital luminance signal Yd output from the scan converter 13 is input to the black level extension circuit 30 where it is subjected to black level extension processing controlled by the second control signal. The thus black level extended digital luminance signal Yd is further input to the color matrix circuit 31. To the color matrix circuit 31, the digital color (color difference) signals Cbd and Crd output from the scan converter 13 are also input. The color matrix circuit 31 converts the digital luminance signal Yd and digital color (color difference) signals Cbd and Crd into red (R), green (G), and blue (B) digital video signals Rd, Gd, and Bd which are, in turn, output to the display unit. The contrast adjusting circuitry of FIG. 9 constitutes a part of a video display apparatus. The digital video signals Rd, Gd, and Bd output from the color matrix circuit in FIG. 9 are input to the display unit 2 and video images reproduced from them are displayed on the screen of the display unit 2.

According to Embodiment 2 described hereinbefore, stable and high contrast video images can be reproduced as is the case for the foregoing Embodiment 1. Decrease in color depth can be prevented. Moreover, by black level extension processing, video images with a sharper black are reproduced.

Figure 10:
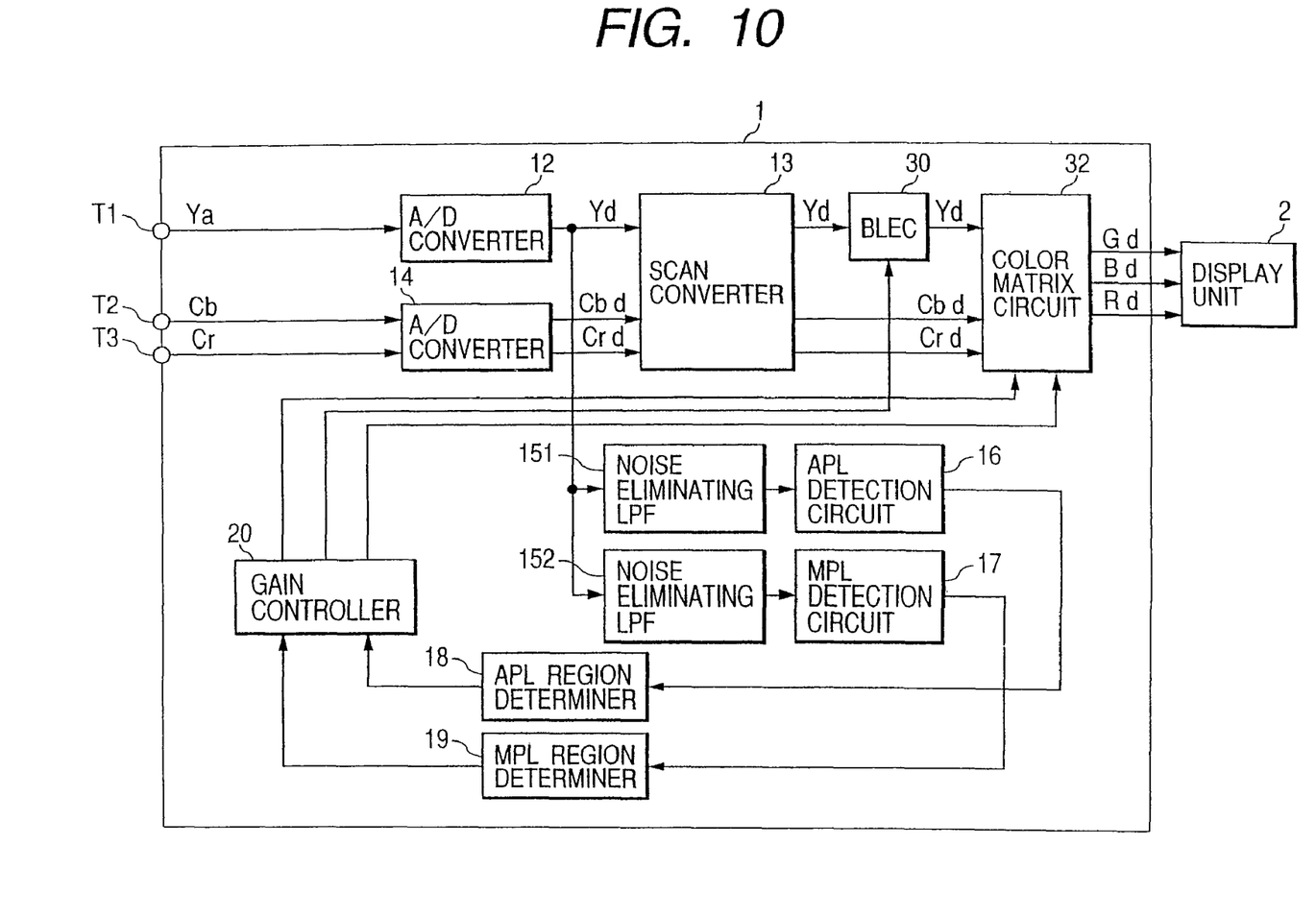
FIG. 10 is a block diagram showing a configuration example of contrast adjusting circuitry as Embodiment 3 of the invention.

FIG. 10 is a block diagram depicting a preferred Embodiment 3 of the present invention, the diagram showing a configuration example of contrast adjusting circuitry of Embodiment 3.

Embodiment 3 of the invention illustrates the contrast adjusting circuitry that detects maximum and average picture levels of analog-to-digital converted luminance signals for a predetermined period, determines one of the predefined luminance regions within which the maximum picture level falls and one of the predefined luminance regions within which the average picture level falls, and, based on the thus determined luminance regions of both maximum and average picture levels, carries out digital luminance signal gain control after A/D conversion, digital color (color difference) signal gain control after A/D conversion, and black level extension processing for digital luminance signals after A/D conversion. The above digital luminance signal gain control and digital color (color difference) signal gain control are carried out in the color matrix circuit.

In FIG. 10, reference number 1 denotes the contrast adjusting circuitry; and 2 denotes a display unit that displays video images. As the display unit, a PDP, liquid crystal display panel, or the like may be used. Reference number 12 denotes an A/D converter that converts an analog luminance signal Ya to a digital luminance signal Yd; 13 denotes a scan converter that converts input signals to signals with timing adjusted to be displayable by the display unit; and 14 denotes an A/D converter that converts analog color (color difference) signals Cb, Cr to digital color (color difference) signals Cbd, Crd. Reference numbers 151 and 152 denote noise eliminating LPFs that are low-pass filters for eliminating noise from digital luminance signals Yd output by the A/D converter. Reference number 16 denotes an APL detection circuit that detects an average picture level of digital luminance signals output by the noise eliminating LPF 151 for a predetermined period, for example, one frame or one field. Reference number 17 denotes an MPL detection circuit that detects a maximum picture level (MPL) of digital luminance signals output by the noise eliminating LPF 152 for a predetermined period, for example, one frame or one field. Reference number 18 denotes an APL region determiner to which the data (signal) of the average picture level detected by the APL detection circuit 16 is input. The APL region determiner determines one of the predefined luminance regions within which the average picture level falls. Reference number 19 denotes an MPL region determiner to which the data (signal) of the maximum picture level detected by the MPL detection circuit 17 is input. The MPL region determiner determines one of the predefined luminance regions within which the maximum picture level falls. Reference number 20 denotes a gain controller that generates control signals for controlling the digital luminance signal gain and digital color (color difference) signal gain, based on the data of what luminance region within which the average picture level falls and what luminance region within which the maximum picture level falls. Reference number 30 denotes a black level extension circuit that carries out black level extension processing. Reference number 32 denotes a color matrix circuit that converts the digital luminance signal Yd and digital color (color difference) signals Cbd, Crd into red (R), green (G), and blue (B) digital video signals Rd, Gd, and Bd. Terminal T1 is an input terminal for analog luminance signals Ya. Terminals T2 and T3 are input terminals for analog color (color difference) signals Cb and Cr, respectively. In Embodiment 3 also, among the above-mentioned components, the APL region determiner 18, MPL region determiner 19, and gain controller 20 may be integrated into a single entity of hardware, for example, a microcomputer. The A/D converters 12, 14, scan converter 13, noise eliminating LPFs 151, 152, APL detection circuit 16, MPL detection circuit 17, black level extension circuit 30, and color matrix circuit 31 may be integrated into a single entity of hardware, for example, an LSI (large scale integrated circuit).

In the contrast adjusting circuitry of FIG. 10, an analog luminance signal Ya input at the input terminal T1 is converted to a digital luminance signal Yd by the A/D converter 12. The digital luminance signal Yd is input to the scan converter 13 and the noise eliminating LPFs 151 and 152. Digital luminance signals from which noise was eliminated by the noise eliminating LPFs 151 and 152 are input to the APL detection circuit 16 and MPL detection circuit 17. The APL detection circuit 16 detects an average picture level of digital luminance signals input to it for a predetermined period. The MPL detection circuit 17 detects a maximum picture level of digital luminance signals input to it for a predetermined period. The thus detected APL and MPL data are respectively input to the APL region determiner 18 and MPL region determiner 19. The APL region determiner 18 determines what luminance region of the predefined divided APL regions within which the detected average picture level falls. The MPL region determiner 19 determines what luminance region of the predefined divided MAX regions within which the detected maximum picture level falls. Specifically, for instance, the APL region determiner determines one of the four APL regions within which the detected average picture level falls. The four APL regions are, as described for FIG. 2, high average luminance region ((1) high APL region), medium average luminance region ((2) medium APL region), low average luminance region ((3) low APL region), and very low average luminance region ((4) very low APL region). The MPL region determiner determines one of the three regions within which the detected maximum picture level falls. The three regions are, as described for FIG. 2, saturated luminance region ((1) saturated MAX region), high luminance region ((2) high MAX region), and low luminance region ((3) low MAX region). The data of the thus determined luminance region within which the average picture level falls and the data of the thus determined luminance region within which the maximum picture level falls are input to the gain controller 20. At the same time, the average picture level used in determining the luminance region is also input from the APL region determiner 18 to the gain controller. Based on the luminance region data and the average picture level, the gain controller 20 generates first, second, and third control signals. The first control signal is input to the color matrix circuit 32 and for controlling the digital luminance signal gain in the color matrix circuit 32, thus adjusting the contrast. For example, this control signal is generated, based on the possible cases of combinations of the luminance region within which the detected average picture level falls and the luminance region within which the detected maximum picture level falls, which are illustrated in FIG. 3. The second control signal is input to the black level extension circuit 30, causing the circuit to carry out black level processing. This control signal is generated, based on the detected average picture level data. The third control signal is input to the color matrix circuit 32 as the first control signal is done and for controlling the digital color (color difference) signal gain in the color matrix circuit 32. This control signal is generated, based on the gain for contrast adjustment made by the first control signal. Digital color (color difference) signals Cbd and Crd output by the A/D converter 14 are input to the scan converter 13 as the digital luminance signal Yd is done. The digital luminance signal Yd output from the scan converter 13 is input to the black level extension circuit 30 where it is subjected to black level extension processing controlled by the second control signal. The thus black level extended digital luminance signal Yd is further input to the color matrix circuit 31. In the color matrix circuit 32, the contrast is controlled by the above-mentioned first control signal, color depth is controlled by the above-mentioned third control signal, and the digital luminance signal Yd and digital color (color difference) signals Cbd and Crd are converted into red (R), green (G), and blue (B) digital video signals Rd, Gd, and Bd which are, in turn, output to the display unit. The contrast adjusting circuitry of FIG. 10 constitutes a part of a video display apparatus. The digital video signals Rd, Gd, and Bd output from the color matrix circuit in FIG. 10 are input to the display unit 2 and video images reproduced from them are displayed on the screen of the display unit 2.

According to Embodiment 3 described hereinbefore, stable and high contrast video images can be reproduced as is the case for the foregoing Embodiments 1 and 2. Decrease in color depth can be prevented. Moreover, by black level extension processing, video images with a sharper black are reproduced.

Figure 11:
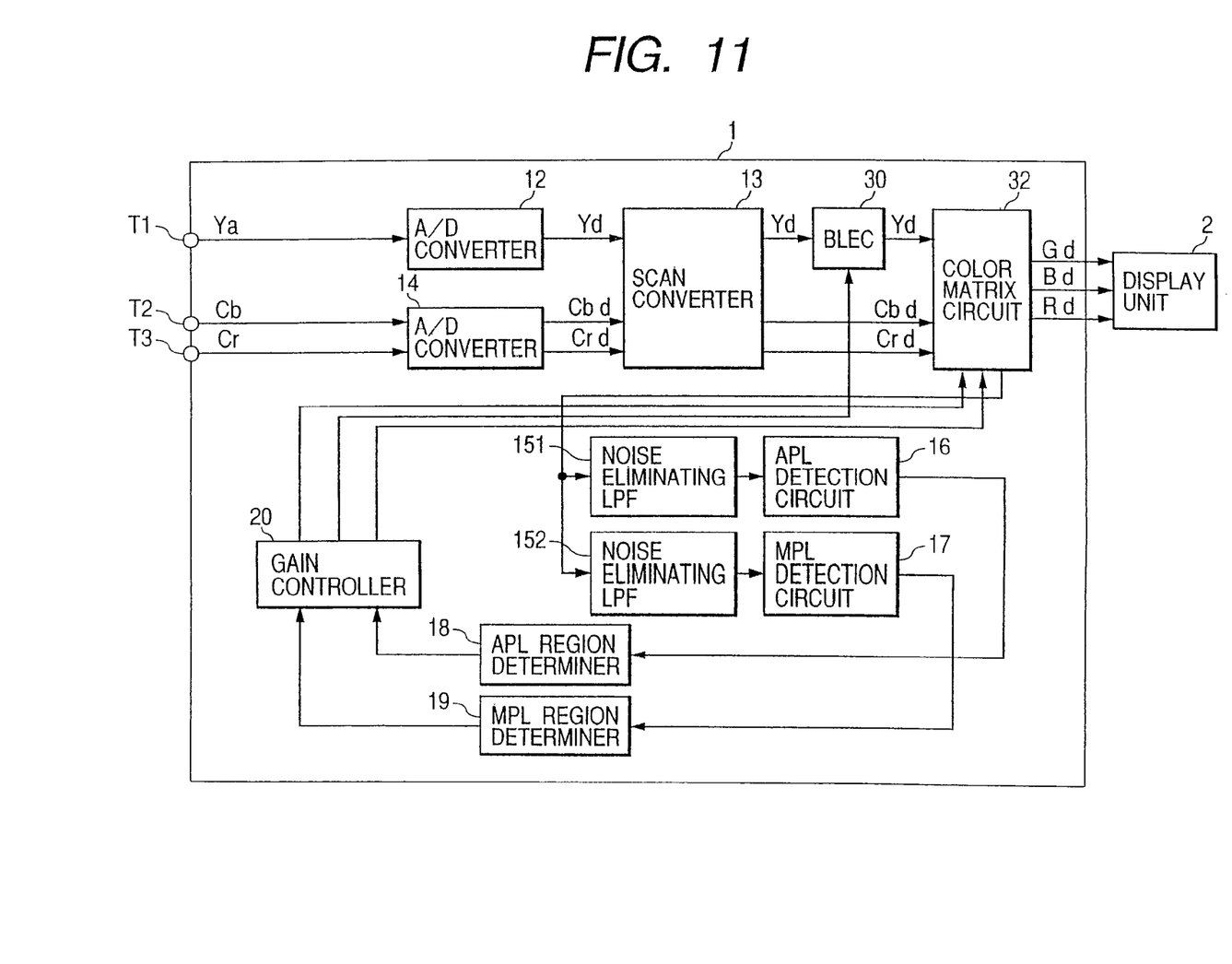
FIG. 11 is a block diagram showing a configuration example of contrast adjusting circuitry as Embodiment 4 of the invention.

FIG. 11 is a block diagram depicting a preferred Embodiment 4 of the present invention, the diagram showing a configuration example of contrast adjusting circuitry of Embodiment 4.

Embodiment 4 of the invention illustrates the contrast adjusting circuitry in which digital luminance signals to be input to the noise eliminating LPFs 151 and 152 are those from the color matrix circuit 3, instead of those that are direct outputs of the A/D converters 12 and 14. Such digital luminance signals have been gain controlled in the color matrix circuit 33 and the result of gain control is reflected in them.

The components of the circuitry operate in the same way as described for the foregoing Embodiment 3.

According to Embodiment 4, stable and high contrast video images can be reproduced as is the case for the foregoing Embodiments 1, 2, and 3. Decrease in color depth can be prevented. Moreover, by black level extension processing, video images with a sharper black are reproduced.

While, in the foregoing embodiments, color correction is performed by controlling the gain of either analog color (color difference) signals before A/D conversion or digital color (color difference) signals after A/D conversion, it should be appreciated that the invention should not be limited to the manner of color correction described herein. Rather, color correction may be performed by controlling the gain of both analog color (color difference) signals before A/D conversion and digital color (color difference) signals after A/D conversion. Similarly, for luminance signal gain control also, the gain of both analog luminance signals before A/D conversion and digital luminance signals after A/D conversion may be controlled. While, in the foregoing embodiments, the contrast adjusting circuitry was configured such that black level extension and color correction are performed together with contrast adjustment, it should be appreciated that the invention should not be limited to the circuitry disclosed herein. In some embodiments, it may be possible to configure the contrast adjusting circuitry so that either black level extension or color correction is performed or neither black level extension nor color correction is performed. It may be also possible to configure the contrast adjusting circuitry, dispensing with the noise eliminating means such as the noise eliminating LPFs. Digital luminance signals for which maximum and average picture levels for a predetermined period are detected are not limited to those that are direct outputs of the A/D converters in the foregoing Embodiments 1, 2, and 3 also, as is the case for Embodiment 4.

According to the present invention, stable and high contrast video images can be reproduced.

We claim:

1. A video display apparatus which displays a video image based on a video signal using a fixed-pixel type device, comprising
a contrast adjusting unit to adjust the contrast of the video image by controlling the gain of the video signal based on a maximum luminance level information and an average luminance level information of the video signal; and
a black level extension unit to perform black level extension processing for the video signal,
wherein the black level extension unit is configured to decrease an output luminance level corresponding to an input luminance level which is equal to or lower than a starting level set for the video signal in the case where the contrast is adjusted to increase by the contrast adjusting unit.

2. The video display apparatus according to claim 1, wherein the contrast adjusting unit is configured to adjust the contrast of the video image by controlling the gain of an analog video signal or the gain of a digital video signal.

3. The video display apparatus according to claim 1, wherein the fixed-pixel type device is a plasma display panel or a liquid crystal panel.

4. The video display apparatus according to claim 1, wherein the maximum luminance level information and the average luminance level information are detected for a period of one frame or one field of the video image.

5. The video display apparatus according to claim 1, wherein the black level extension unit performs the black level extension processing based on the average luminance level information of the video signal.

6. The video display apparatus according to claim 5, wherein the black level extension unit is configured to perform the black level extension processing so that the higher the average luminance level information is, the larger the decreasing amount of the output luminance level is.

7. The video display apparatus according to claim 5, wherein the black level extension unit is so configured as not to perform the black level extension processing if the average luminance level information is equal to or lower than a set value, and to perform the black level extension processing if the average luminance level information is equal to or larger than the set value.

8. The video display apparatus according to claim 7, wherein the black level extension unit is configured so that the unit performs the black level extension processing based on the characteristic of the decreasing amount corresponding to the average luminance level information and that the characteristic of the decreasing amount in the case, where the average luminance level information falls within a second luminance region which is larger than a first luminance region, that is, a region between the set value and a prescribed value, is smaller than the characteristic of the decreasing amount in the case where the average luminance level information falls within the first luminance region.

9. The video display apparatus according to claim 1, wherein the black level extension processing is performed by the black level extension unit after the contrast is adjusted by the contrast adjusting unit.

\* \* \* \* \*